Patented June 26, 1951

2,558,068

UNITED STATES PATENT OFFICE 2,558,068

PROCESS OF PRODUCING 3,4-DIMETHYL-5-PHENYL-2-IMINOTHIAZOLIDINES

Anton Wolf, Heidelberg, Germany

No Drawing. Application August 23, 1949,
Serial No. 111,979

10 Claims. (Cl. 260—306.7)

The present invention relates to organic compounds being useful for therapeutic application. More specifically the invention relates to a new process of producing substituted 2-iminothiazolidines, exactly speaking 3,4-dimethyl-5-phenyl-2-iminothiazolidines these compounds representing chemotherapeutic substances of high value.

3,4-dimethyl-5-phenyl-2-iminothiazolidines are produced by causing a thiocyanic acid salt to act upon 1-phenyl-1-chloro-2-methylamino-propane hydrochloride in the presence of a solvent or suspension medium. The reaction takes place in two well distinguishable stages the first one comprising heating both reaction components in an acid reactive medium having a pH of 1–2.5 this stage leading to the formation of 1-phenyl-1-thiocyan-2-methylamino-propane, the second one comprising the further heating of the reaction product of the first stage in an alkaline reactive medium having a pH of 5.4–8.5 this stage leading to 3,4-dimethyl-5-phenyl-2-iminothiazolidine a nucleus having been formed. Advantageously both phases of the reaction are combined into one single stage the combination being realized by heating the initial products in an alkaline reactive medium from the beginning of the reaction; 3,4-dimethyl-5-phenyl-2-iminothiazolidine is the immediate reaction product. 1-phenyl-1-thiocyan-2-methylamino-propane, however, can also be used as initial material and can be converted into 3,4-dimethyl-5-phenyl-2-iminothiazolidine by being heated in an alkaline reactive medium.

If the above named two reaction components are caused to react with each other in a neutral organic solvent, heating at a reflux condenser for 8 hours is necessary. But if an alkaline agent, e. g. a caustic alkali, ammonia, methylamine, aniline, ephedrin, pyridine or quinoline, are added to the organic solvent, the reaction is finished after a short time.

Instead of 1-phenyl-1-chloro-2-methylamino-propane hydrochloride the analogously constituted 1-phenyl-1-bromo-2-methylamino-propane hydrobromide can be used as starting material. If the optically active 3,4-dimethyl-5-phenyl-2-iminothiazolidines are intended to be produced, the levorotatory - 1 - phenyl - 1-chloro-2-methylamino-propane hydrochloride is used as starting material for producing the dextrorotatory compound from which by being acted upon with a thiocyanic acid salt the thiocyanic acid salt of d-3,4-dimethyl-5-phenyl-2-iminothiazolidine can be produced. In an analogous manner d-1-phenyl-1-chloro-2-methylamino-propane hydrochloride leads to the thiocyanate of l-3,4-dimethyl-5-phenyl-2-iminothiazolidine.

Preferably the alkali salts of thiocyanic acid are used in the process of the present invention, e. g. the sodium salt, the potassium salt or the ammonium salt. As solvent or suspension medium an organic solvent, e. g. methanol, ethanol, dibutyl ether, the chlorine-substitution products of hydrocarbons, such as chlorofrom or ethylene dichloride, furthermore benzene or pyridine, can be used apart from water.

In the above described process the reaction products are produced as salts of the thiocyanic acid. The thiocyanates can be transformed into a salt of any other acid according to known methods.

The following examples are inserted in order to illustrate the above described invention.

(1.) 1.5 kg. of racemic 1-phenyl-1-chloro-2-methylamino-propane hydrochloride are suspended in 6 liters of ethyl alcohol together with 1.15 kg. of ammonium thiocyanate and 25 g. of dry caustic potash or caustic soda and the reaction mixture is heated at a reflux condenser for two hours. The reaction product having cooled down the precipitate which has formed and is composed of 3,4-dimethyl-5-phenyl-2-iminothiazolidine thiocyanate and ammonium chloride is extracted with water in order to remove the ammonium chloride. The remaining salt of the thiazolidine is recrystallized from hot water. The thiocyanate of the base melts in the pure state at 190–192° C. The yield amounts to about 80% of the theoretical yield.

The free base is precipitated by adding an alkali to the aqueous solution of the dimethyl-phenyl-iminothiazolidine thiocyanate. The free base is an oil which can be converted into its hydrochloride by dissolving the oil in ethyl alcohol, drying the solution and treating it with hydrochloric acid dissolved in ethyl alcohol; the hydrochloride has the melting point of 222°–224° C.

If the levorotatory 1-phenyl-1-chloro-2-methylamino-propane hydrochloride is used as starting material, the above described method results in the formation of the thiocyanic acid salt of d-3,4-dimethyl-5-phenyl-2-iminothiazolidine, the thiocyanate having the melting point of 170–171° C., and a 5% methanol solution of this thiocyanate shows the specific rotation of $[\alpha]D^{20°} = +124°$. By dissolving the resulting thiocyanate in water and adding an alkali to the aqueous solution the free base is precipitated as an oil which is converted into the hydrochloride of the base by treating the oil with hydrochloric acid dissolved in ethyl alcohol. The hydrochloride melts at 235–238° C. It is likewise dextrorotatory the specific rotation of a 5% aqueous solution, amounting to $[\alpha]D^{20°} = +156.4°$.

In an analogous manner the hydrochloric acid salt of l-3,4-dimethyl-5-phenyl-2-iminothiazolidine is formed, if the dextrorotatory 1-phenyl-1-chloro-2-methylamino-propane hydrochloride is used as starting material in the above described process. The l-3,4-dimethyl-5-phenyl-2-imino-thiazolidine hydrochloride has the melting point of 235–238° C. and shows in a 5% aqueous solution the specific rotation of $$[\alpha]D^{20°} = -156°$$

(2.) 26.6 g. of the thiocyanic acid salt of 1-phenyl-1-thiocyan-2-methylamino-propane are dissolved in 150 ccm. of water while heating and 5 ccm. of concentrated caustic soda solution are added to the solution. Crystals of the thiocyanic acid salt of dimethyl-phenyl-iminothiazolidine begin to separate very soon. The yield amounts to 23.5 g., that are 88% of the theoretical yield.

(3.) 18.75 g. of racemic 1-phenyl-1-chloro-2-methylamino-propane hydrochloride and 14.5 g. of ammonium thiocyanate are suspended in a mixture being composed of 450 ccm. of ethylene dichloride and 50 ccm. of pyridine and heated at a reflux condenser on the water bath for ½ hour. The reaction product is further treated as has been described in Example 1. The yield amounts to 12.8 g. corresponding to 61.2% of the theoretical yield.

(4.) 18.75 g. of racemic 1-phenyl-1-chloro-2-methylamino-propane hydrochloride, 14.5 g. of ammonium thiocyanate and 10 g. of l-ephedrin are suspended in 500 ccm. ethylene dichloride and heated at a reflux condenser on the water bath for 2 hours. The reaction product is cooled down to 0° C., the separating mass of crystals is filtered with suction and then carefully washed out with ethylene dichloride and subsequently with water. The yield amounts to 17.9 g. corresponding to 85.5% of the theoretical yield.

(5.) 37.5 g. of racemic 1-phenyl-1-chloro-2-methylamino-propane hydrochloride are suspended in 200 ccm. of water, 29 g. of the ammonium salt of thiocyanic acid are added to the suspension and the mixture is heated to about 80° C. on the water bath for one hour a pH of 1–2.5 being maintained. The reaction product after having cooled down separates as a mass of crystals and 33 g. of the thiocyanic acid salt of 1-phenyl-1-thiocyan-2-methylamino-propane of the melting point of 135–139° C. are obtained; this yield amounts to 81.2% of the theoretical yield. The corresponding free base melts at 75–78° C., the hydrochloride of the base melts at 208–210° C.

26.6 g. of the thiocyanic acid salt of 1-phenyl-1-thiocyan-2-methylamino-propane are dissolved in 150 ccm. of water while heating and 5 ccm. of concentrated caustic soda solution are added to the solution. Crystals of the thiocyanic acid salt of dimethyl-phenyl-iminothiazolidine begin to separate very soon. The yield amounts to 23.5 g., that are 88% of the theoretical yield.

After having fully described and disclosed the present invention, what I claim is:

1. The process of producing substituted 2-iminothiazolidines, chosen from the group consisting of the racemic, the levorotatory and the dextrorotatory 3,4 - dimethyl-5-phenyl-2-iminothiazolidine which process comprises causing a salt of thiocyanic acid to act upon a compound chosen from the group consisting of the racemic, the levorotatory and the dextrorotatory 1-phenyl-1-halogen-2-methylamino-propane hydrohalide, whilst the reactive materials are suspended in a diluent vehicle in which they are at least partly soluble, said vehicle being chosen from the group consisting of methanol, ethanol, di-butyl ether, a chlorine-substitution product of a lower aliphatic hydrocarbon, benzene, pyridine and water.

2. The process of producing 3,4-dimethyl-5-phenyl-2-iminothiazolidine which process comprises causing a salt of thiocyanic acid to act upon 1-phenyl-1-chloro-2-methylamino-propane hydrochloride suspended in a diluent vehicle in which the reactive materials are at least partly soluble while making alkaline the pH of the reaction mixture.

3. The process of producing 3,4-dimethyl-5-phenyl-2-iminothiazolidine which process comprises causing the ammonium salt of thiocyanic acid to act upon 1-phenyl-1-halogen-2-methylamino-propane hydrohalide suspended in a diluent vehicle in which the reactive materials are at least partly soluble while making alkaline the pH of the reaction mixture.

4. The process of producing 3,4-dimethyl-5-phenyl-2-iminothiazolidine which process comprises causing the ammonium salt of thiocyanic acid to act upon 1-phenyl-1-chloro-2-methylamino-propane hydrochloride suspended in a diluent vehicle in which the reactive materials are at least partly soluble while making alkaline the pH of the reaction mixture.

5. The process of producing 3,4-dimethyl-5-phenyl-2-iminothiazolidine which process comprises causing a salt of thiocyanic acid to act upon 1-phenyl-1-halogen-2-methylamino-propane hydrohalide in an aqueous alkaline medium having a pH of 5.4–8.5.

6. The process of producing 3,4-dimethyl-5-phenyl-2-iminothiazolidine which process comprises causing a salt of thiocyanic acid to act upon 1-phenyl-1-halogen-2-methylamino-propane hydrohalide suspended in a diluent vehicle in which the reactive materials are at least partly soluble containing an alkaline reactive agent.

7. The process of producing 3,4-dimethyl-5-phenyl-2-iminothiazolidine which process comprises the steps consisting in heating 1-phenyl-1-halogen-2-methylamino-propane hydrohalide and a salt of thiocyanic acid suspended in a diluent vehicle in which the reactive materials are at least partly soluble while maintaining a pH of 1–2.5 in the reaction mixture and subsequently heating the previously formed 1-phenyl-1-thiocyan-2-methylamino-propane in an alkaline reactive medium having a pH of 5.4–8.5.

8. The process of producing 3,4-dimethyl-5-phenyl-2-iminothiazolidine which process comprises the step consisting in heating the thiocyanic acid salt of 1-phenyl-1-thiocyan-2-methylamino-propane suspended in a diluent vehicle in which the reactive materials are at least partly soluble.

9. The process of producing 3,4-dimethyl-5-phenyl-2-iminothiazolidine which process comprises the step consisting in heating the thiocyanic acid salt of 1-phenyl-1-thiocyan-2-methylamino-propane suspended in a diluent vehicle in which the reactive materials are at least partly soluble while making alkaline the pH of the reaction mixture.

10. The process according to claim 8 in which the heating of the thiocyanic acid salt of 1-phenyl-1-thiocyan-2-methylamino-propane is carried out in a diluent vehicle which also contains an alkaline agent chosen from the group consisting of caustic alkali, ammonia, methylamine, aniline, ephedrine, pyridine and quinoline.

ANTON WOLF.

No references cited.